(No Model.)
H. DANIELS.
LUMBER TRUCK.
No. 500,862.　　　　　　　　　　Patented July 4, 1893.
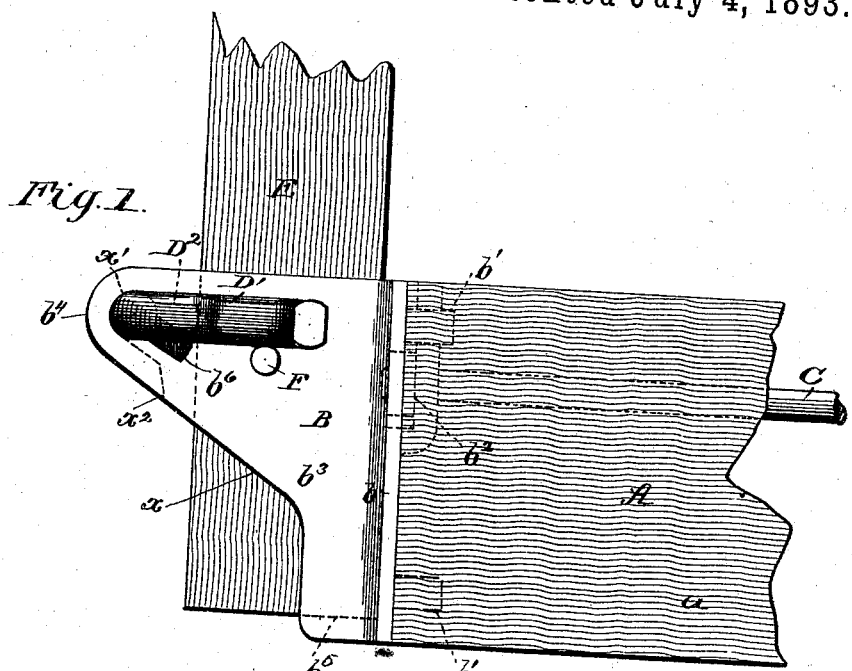
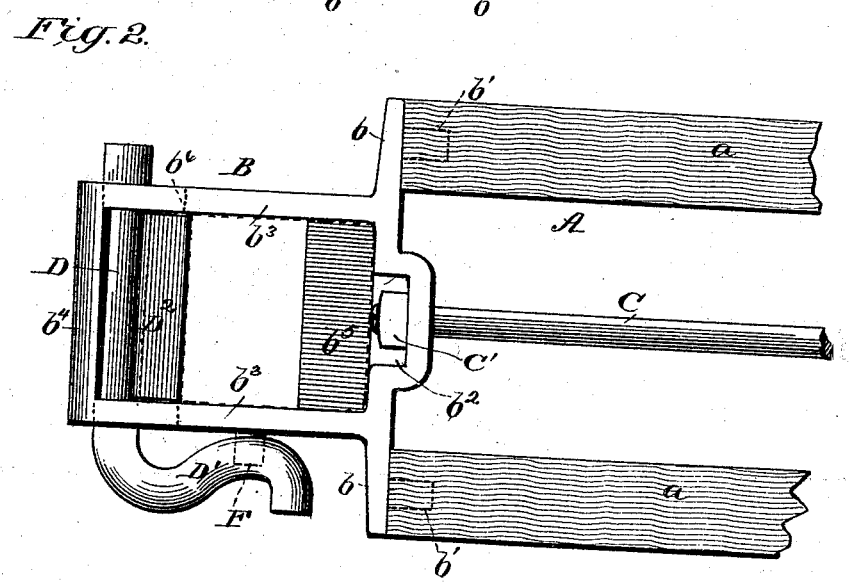
WITNESSES:
Fred G. Dieterich
Jos. A. Ryan
INVENTOR:
Howard Daniels
BY Munn & Co
ATTORNEYS

United States Patent Office.

HOWARD DANIELS, OF ATLANTA, GEORGIA, ASSIGNOR OF ONE-HALF TO JAMES H. SIMONSON, OF FORT WAYNE, INDIANA.

LUMBER-TRUCK.

SPECIFICATION forming part of Letters Patent No. 500,862, dated July 4, 1893.

Application filed March 29, 1893. Serial No. 468,113. (No model.)

*To all whom it may concern:*

Be it known that I, HOWARD DANIELS, of Atlanta, in the county of Fulton and State of Georgia, have invented a new and useful Improvement in Lumber-Trucks, of which the following is a specification.

This invention relates generally to an improved truck for carrying lumber, and particularly to certain improvements upon my truck for which I have made application, Serial No. 455,937.

This invention is also designed to be used in connection with my improved lumber piling machine for which I have also made application. This machine piles the lumber upon the truck on end instead of flat, and in order to unload said truck the entire load is tilted so that the tiers of boards will be inclined and one tier can be taken down at a time. In order to accomplish this tilting of the entire load it is necessary that the end stakes should also tilt and for this purpose I provided tilting stake sockets, and covered the same by my previous application.

The object of my present invention is to provide certain improvements for the said stake sockets whereby they are made simpler, stronger, and more efficient and at the same time the entire truck is strengthened.

With these objects in view my invention consists of a rigid socket adapted to receive the stake and a locking device for normally holding the said stake in a vertical position, which locking device can be thrown back and permit the stake to tilt whenever it is necessary.

My invention consists also in certain novel connections between the stake socket and truck frame, whereby the said frame is strengthened.

My invention consists also in the peculiar construction of the socket and its connected parts.

In the drawings forming a part of this specification Figure 1 is a side view of one end of the truck with the socket attached thereto and the stake within the socket. Fig. 2 is a top plan view of the same.

In carrying out my invention I employ a truck A each side of which is made up of the two parallel longitudinal beams $a$ $a$. The stake socket casting B is connected to the ends of these beams and serves the purpose of a cap or facing for said beams. The casting B comprises a plate $b$ which is made of a width sufficient to extend across the ends of the adjacent beams $a$, and the rear face of this plate $b$ is formed with four lugs $b'$, which are intended to enter the ends of the beams $a$, two being inserted in each beam and it will be noticed that the ends of the beam are mortised to receive said lugs. The castings are arranged at each end of the truck, and in order to hold them firm to the ends of the beams and also strengthen the truck, I employ a rod C which extends from end to end of the truck between the beams $a$ and its opposite ends pass through the plates $b$ of the opposing castings B. The ends of the rod C are threaded, and upon said ends are screwed the nuts $C'$, the plates $b$, being recessed at $b^2$, to receive said nuts, and thus provide an unobstructed passage for the stake. The socket is formed by the plate $b$, the side pieces $b^3$ and the end piece $b^4$ of the casting, and at the bottom of the plate $b$ is formed a ledge $b^5$ upon which the lower end of the stake is adapted to rest. The sides of the socket are cut away as shown at $x$ for the purpose of lightness and the end piece extends from $x'$ to $x^2$ for the purpose of strength. The sides of the socket are apertured at $b^6$ to permit the passage of a shaft D having a crank handle $D'$ (and in one of the sides of the socket is made a slot $b^7$ which communicates with the aperture $b^6$ for the purpose of allowing the shaft D to be inserted in the socket,) said shaft carrying a wing or projection $D^2$ which normally extends inward and bears upon the stake and holds the same in place.

E indicates the stake the lower end only of which is shown in the drawings it being understood that the upper ends are connected the same as in my prior application before referred to.

F indicates a pin inserted in the side of the socket and upon which the crank handle bears so that the wing or projection cannot fall below a horizontal plane.

In assembling the parts the castings are set in place at each end of the truck and connected by means of the rod and nuts. The shaft carrying the wing or projection is then inserted and the stop put pin in place. The stake is then inserted and held in a vertical position.

When it is desired to tilt the stake, the crank handle is thrown up until the wing or projection strikes the point $x'$. The stake can then be tilted forward, and the stakes at the opposite end of the truck can have a limited movement upon the ledges of their sockets.

Having thus described my invention, what I claim as new, and desire to secure by Letters Patent, is—

1. In a lumber truck, the combination, with the side beams, of the socket castings, the longitudinal rod and the nuts upon the ends of the same substantially as shown and described.

2. In a lumber truck, the combination with the side beams, of the socket castings having lugs and recesses the tie rod or bar and the nuts upon the ends and in the recesses of the castings substantially as shown and described.

3. An improved stake socket having a horizontal ledge at its bottom, and a pivoted locking device arranged between its sides near the forward upper end substantially as shown and described.

4. The combination with a stake, of a socket having a recess of greater area than the cross section of the stake, a horizontal ledge at the bottom and a pivoted locking device pivoted between the sides of the socket and adapted to bear upon the face of the stake to hold the same vertical substantially as shown and described.

5. In a lumber truck, the combination with the truck of the stake socket secured thereto, the shaft having a wing or projection and a crank handle substantially as shown and described.

6. The combination with a socket composed of a back plate side and end pieces, the bottom ledge of the shaft having a wing or projection and a crank handle substantially as shown and described.

7. The combination with a socket composed of the back plate having lugs and a ledge, the side and end pieces of the shaft having a wing or projection and a crank handle, and the stop pin in the side of the socket substantially as and for the purpose described.

HOWARD DANIELS.

Witnesses:
W. R. RESPESS,
W. J. COOPER.